(12) United States Patent
Witte

(10) Patent No.: US 6,375,177 B1
(45) Date of Patent: Apr. 23, 2002

(54) BASE PLATE FOR BUILDING DEVICES FOR CLAMPING WORKPIECES

(75) Inventor: Horst Witte, Nahrendorf (DE)

(73) Assignee: Horst Witte Entwicklungs- und Vertriebs-KG, Nahrendorf (DE)

( * ) Notice: Subject to any disclaimer, the term of this patent is extended or adjusted under 35 U.S.C. 154(b) by 0 days.

(21) Appl. No.: 09/451,139

(22) Filed: Nov. 30, 1999

(30) Foreign Application Priority Data

Dec. 1, 1998 (DE) ...................................... 298 21 418 U

(51) Int. Cl.$^7$ ................................................ B25B 1/20
(52) U.S. Cl. ...................... 269/45; 269/900; 269/289 R
(58) Field of Search ....................... 269/45, 296, 289 R, 269/900

(56) References Cited

U.S. PATENT DOCUMENTS

| 2,443,987 | A | * | 6/1948 | Morrison et al. | ............. 269/45 |
|---|---|---|---|---|---|
| 4,205,835 | A | * | 6/1980 | Gerber | .................. 269/289 R |
| 4,901,990 | A | * | 2/1990 | Frechette | .................... 269/900 |
| 5,026,033 | A | * | 6/1991 | Roxy | ........................ 269/45 |
| 5,505,438 | A | * | 4/1996 | Baldwin et al. | ............ 269/296 |
| 5,732,455 | A | * | 3/1998 | Diede | ......................... 269/45 |

* cited by examiner

Primary Examiner—Joseph J. Hail, III
Assistant Examiner—Lee Wilson
(74) Attorney, Agent, or Firm—Friedrich Kueffner

(57) ABSTRACT

A base plate for building devices for clamping workpieces in a defined and reproducible position has first grid points arranged in a uniform grid pattern defined by perpendicularly crossing center lines spaced from one another by a uniform grid pattern spacing. The first grid points describe an ideal surface of the base plate. Each first grid point is a first concave spherical depression having a center point. Each center point is located on a point of interception of the perpendicularly crossing center lines.

9 Claims, 4 Drawing Sheets

BASE PLATE FOR BUILDING DEVICES FOR CLAMPING WORKPIECES

BACKGROUND OF THE INVENTION

1. Field of the Invention

The invention relates to a base plate, for building devices for clamping workpieces in a defined and reproducible position, with grid points arranged at uniform coordinate spacings.

2. Description of the Related Art

European patent document 0 222 147 B1 shows a system for building devices including a base plate of the aforementioned kind on which the device of the system can be built. The base plate of this known system has fitting bores arranged at uniform coordinate spacings. The fitting bores provide the grid points which define the grid pattern spacing.

SUMMARY OF THE INVENTION

It is an object of the present invention to provide a base plate of the aforementioned kind which can be produced inexpensively without loss of precision and is as universally useable as possible.

In accordance with the present invention, this is achieved in that the grid points are formed in the shape of concave spherical depressions having center points positioned on crossing center lines arranged perpendicularly to one another and spaced by the grid pattern spacing, wherein the crossing center lines define the ideal base plate shape.

The mechanical machining of the base plate is thus limited substantially to the manufacture of the concave spherical depressions which are to be produced at one or both surfaces at the preset grid pattern spacing. The center points of the concave spherical depressions are not necessarily positioned at the physical surface of the base plate but on an "ideal surface". When the actual shape of the base plate deviates from the ideal shape, and this is usually the case for unmachined cast aluminum, the center points are positioned always on the ideal shape and, accordingly, the concave spherical depressions also define the ideal shape. When these concave spherical depressions then are used as grid points for fastening connecting elements and other device modules, the attached components, for example, feet, are always built up starting at the ideal plate shape. The course and the design of the actual surface of the base plate thus do not have any effect. The center points of the concave spherical depressions are thus not positioned on the surface of the actual base plate, but located on its ideal shape. Accordingly, the surface of the spherical depression produced by machining can be differently sized.

According to an especially advantageous embodiment, the base plate, when viewed in a plan view, i.e., onto the clamping or mounting plane, is embodied as a uniform grid structure having diagonal grid rods extending at an angle of 45° to the center lines extending through the center points of the spherical depressions. The center points of the spherical depressions are positioned respectively at the renter portions of the corresponding grid rods. The penetrations or voids between the grid rods have a uniform, preferably substantially square, cross-section.

This embodiment of a grid structure provides a very lightweight base plate which, however, maintains a high stiffness with respect to torsion and bending forces. This base plate can be produced especially economically as a cast aluminum member. A further machining step is not necessary or less machining is needed. Precise measurements of the base plate are not required because the required precision is provided by the spherical depressions and their center lines that are very precisely positioned on the ideal shape. The spherical depressions are provided at the center portions of the grid rods, optionally in a portion of the grid rods having a thicker cross-section, so that the grid pattern spacing is maintained. The diagonal for a corresponding square base structure is always $\sqrt{2}\times$ the grid spacing. The voids or penetrations have a substantially square cross-section which is compromised only by thicker center portions in the area of the concave spherical depressions and by the rod intersections (nods).

In an advantageous embodiment of the base plate with rod intersections (nods) of the diagonal grid rods, second concave spherical depressions are provided having center points positioned on the points of interception of the diagonals of the grid rods. In another preferred embodiment, the spherical depressions have fastening bores which extend perpendicularly to the crossing center lines and which are optionally provided with a thread.

The base plate may be divided, meaning that one large-size base plate is cut to smaller ones which are then combined to a larger base plate of a different size. The base plate in this embodiment is divided along a separating line, extending through the rod intersections of the diagonal grid rods, into two or more correspondingly smaller sized base plate portions. In the vertical separation surfaces (end faces) concave spherical depressions with fastening bores are provided. These individual base plate portions are then assembled to larger ones by means of interposed disc-shaped lenses with correspondingly embodied convex spherical sides and fastening screws. The effective thickness of the disc-shaped lenses corresponds to the thickness of the material removed from the base plate by the cutting process. The special design and connection employing disc-shaped lenses ensures that the grid pattern spacing is not disturbed upon combination of multiple base plate portions of smaller size. The material that has been removed during cutting is thus again added to the grid pattern spacing by the effective thickness of the disc-shaped lenses. The production of large base plates of different dimensions and shapes is thus possible by combining smaller sized base plate portions.

Especially advantageous is a base plate, with concave spherical depressions and optionally fastening bores, arranged preferably only on one side which forms the bottom side of the base plate in its position of use for fastening foot or connecting elements. The feet of the foot and connecting elements is matched to the (preferably square,) shape of the penetrations or voids and in one position can be pushed from the top side of the base plate through the base plate to the bottom side. The surface of the foot facing the bottom side is provided with convex spherical projections positioned relative to one another according to the grid pattern spacing and located at the ends of diagonals extending at a right angle to one another to the ends of the foot. The foot or connecting elements, after insertion and rotation about their axis by 45° and snap-in connection of the convex spherical projections in the correlated concave spherical depressions, are secured by fastening means. This embodiment is especially useful where there is a risk that the surface of the base plate is subjected to high mechanical loads or soiling. In this case, the surface provided with concave spherical depressions is selected as the bottom side so that the unmachined side faces upwardly. The concave spherical depressions of the bottom side (after the base plate has been positioned upside down) are used for fastening foot and/or connecting elements by employing the grid pattern spacing of the spherical depressions. Feet of the foot or connecting elements are pushed through the penetrations or voids and, upon rotation, are then connected to the spherical depressions, in which position they are subsequently secured by suitable fastening means.

The base plate in its various embodiments, especially when embodied as a grid structure with diagonally extending grid rods, when combined of smaller base plate portions, or when provided with foot or connecting elements insertable through the voids of the grid structure and provided with convex spherical projections configured to match the concave spherical depressions as well as the grid pattern, can be used substantially universally in various ways based on the basic grid structure in combination with the concave spherical depressions. Of course, it also serves as a component of the system for building devices as disclosed above.

DESCRIPTION OF THE PREFERRED EMBODIMENTS

Figure 1:
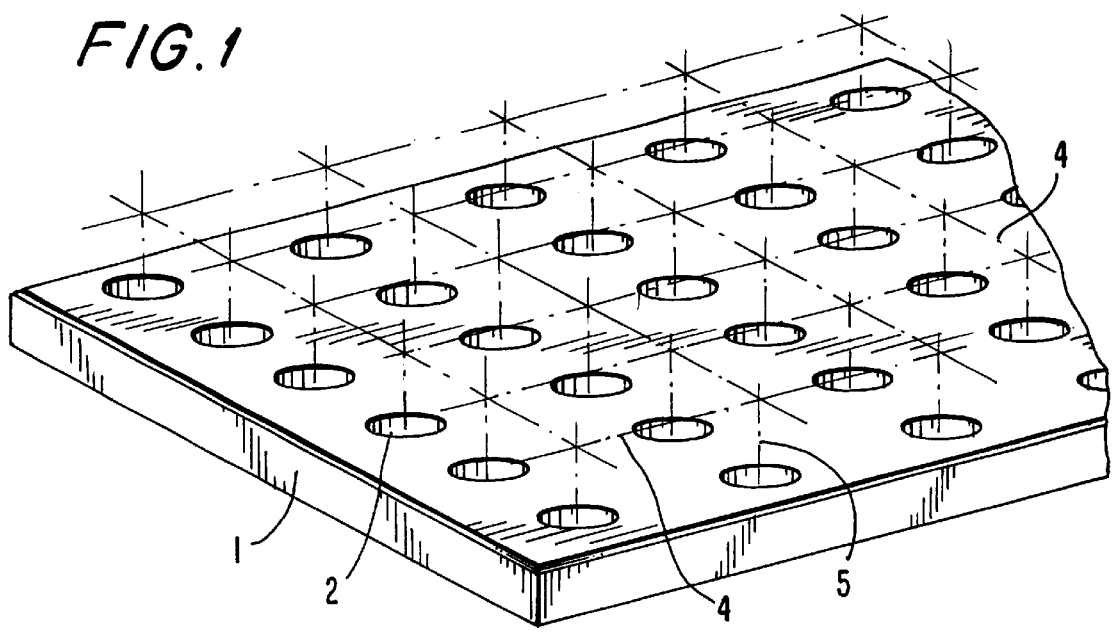
FIG. 1 is a perspective view of an embodiment of the base plate according to the present invention.

The inventive base plate 1 represented in FIG. 1 illustrates the essential features of the invention. The base plate has one or more surfaces that are machined to a greater or lesser extent, but does not have the precise, desired shape and dimensions of a base plate for the disclosed purpose. The ideal plate shape or surface is defined by the center lines 4 of the concave spherical depressions 2 which are precisely machined into the surface. These spherical depressions 2 are arranged with a preset grid pattern spacing in the X and Y plane. Only the spherical depressions 2 are precisely machined. Their center points are positioned on the ideal clamping surface of the base plate so that a precise building onto this base plate is possible without the actual physical surface of the base plate playing a role in this.

Fastening bores can be drilled with the aid of corresponding drilling devices into the concave spherical depressions in the direction of their center axis 5. Such fastening bores are not shown in the illustration.

Figure 2:
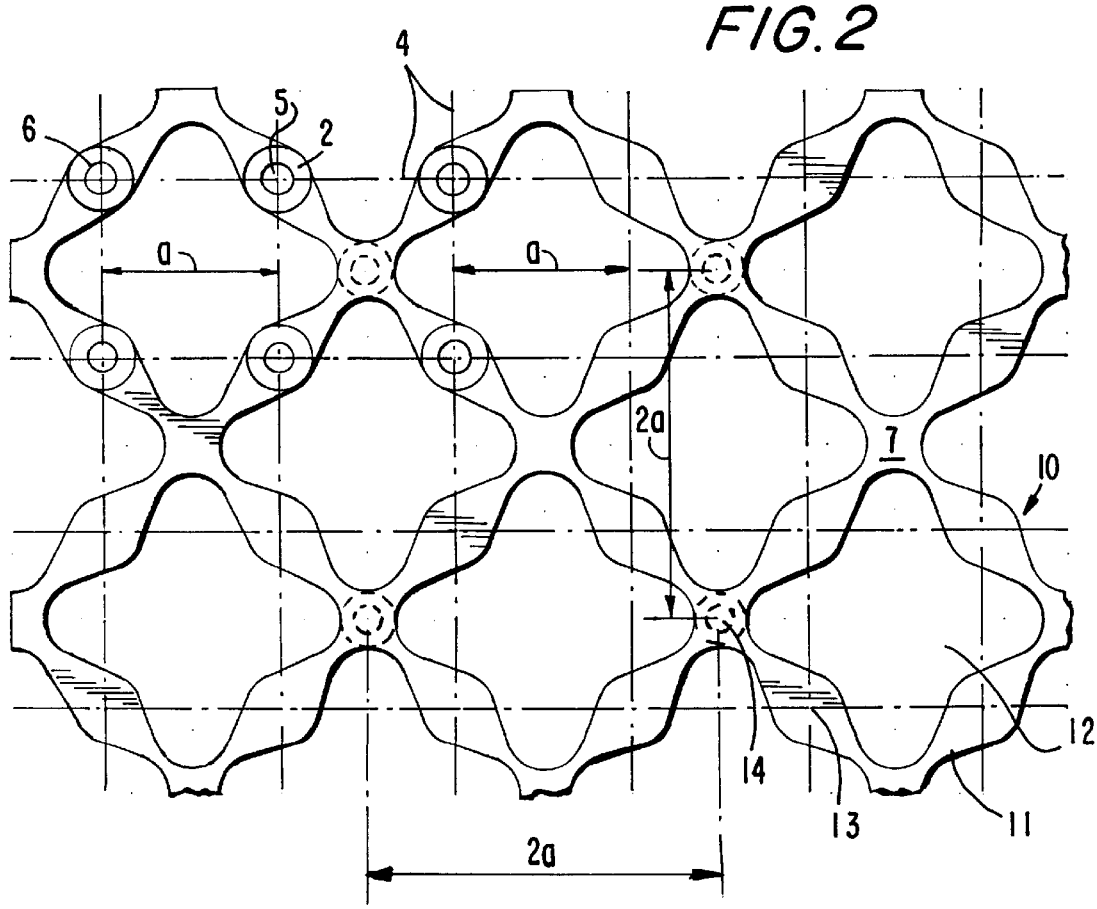
FIG. 2 is a plan view onto another embodiment of the base plate of the invention.

FIG. 2 shows a plan view of a section of an especially advantageous embodiment of the base plate 10. It is embodied as a grid structure produced by casting a cast aluminum member. The grid rods (11) are arranged uniformly as diagonals of squares. They define substantially square penetrations or voids 12 which have center portions 13 of a thickened cross-section in order to provide sufficient substance or material for the concave spherical depressions 2. Neighboring concave spherical depressions 2 are positioned with their center points on a square having a side length a corresponding to the grid pattern spacing. The diagonals of the square, i.e., the grid rod sections 11, have a length of a x $\sqrt{2}$.

When at the rod intersections (nods) of the diagonal grid rods additional (second) concave spherical depressions 2 with center points 14 are provided, they have a spacing between one another of 2a. Accordingly, the grid pattern spacing is, in principle, maintained also with respect to these spherical depressions (14) positioned on the nods.

The penetrations or voids 12 have theoretically the shape of a square which is only compromised by the center portions 13 of thicker cross-section and the formation of the nods 7. The spherical depressions are provided with fastening bores 6, preferably having a thread.

Figure 3:
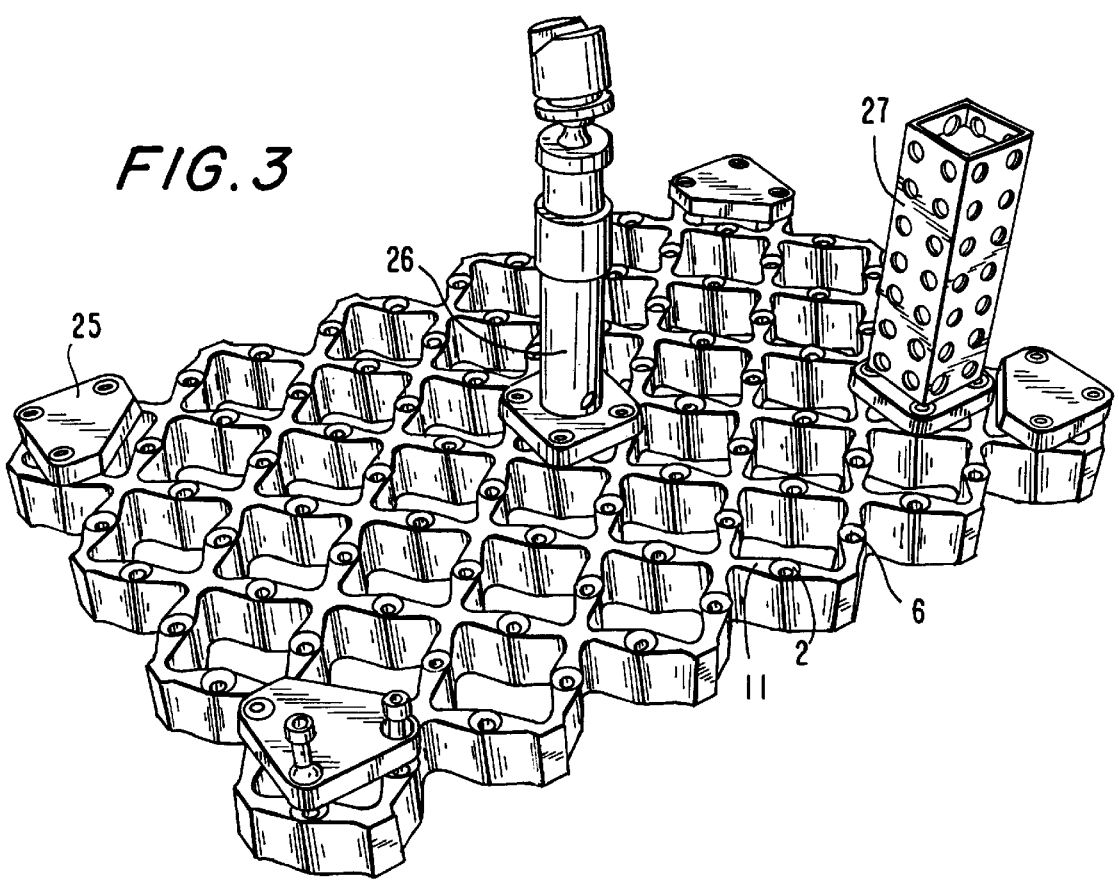
FIG. 3 is a plan view of the embodiment of the base plate according to FIG. 2, with mounted foot and system components.

These spherical depressions serve as fastening points of differently designed mountings elements (foot and/or connecting elements), as illustrated in FIG. 3. In this embodiment, the foot elements 25 have at their underside at least three convex spherical projections which are positioned in the concave spherical depressions 2. Fastening screws 6a penetrate the spherical depressions and are threaded into the thread of the fastening bores 6. The feet, which have a precise and pre-determined length in relation to the convex spherical projections, allow a precise arrangement and alignment of the ideal surface of a platform, he surface being defined by the center points of the concave spherical depressions 2.

With the aid of spherical depressions 2 and the fastening bores 6, differently designed connecting and building elements can be mounted, such as telescopically adjustable fastening members 26 or other modular members, such as a receiving tube 27, having a respectively adjusted or a different grid pattern spacing of its receiving bores.

Figure 4:
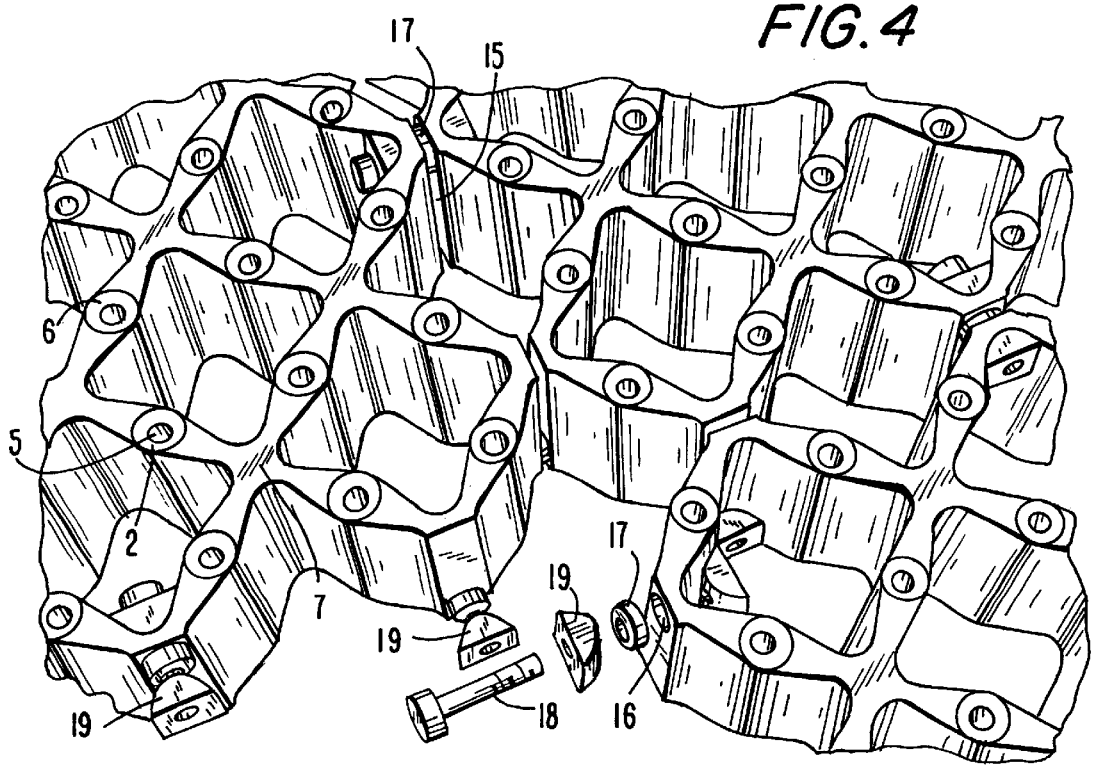
FIG. 4 is a view of the base plate which corresponds substantially to that disclosed in the FIGS. 2 and 3, but divided and reassembled without disrupting the grit pattern spacing of the spherical depressions.

FIG. 4 shows how to produce a smaller sized base plate from a large size base plate, produced by casting aluminum, wherein the grid pattern and spacing of the grid pattern are maintained in the reassembled base plate. The aluminum material which has been removed upon cutting the large base plate into base plate portions in a plane through the nods 7 is compensated during mounting by disc-shaped lenses or members 17 which have an effective thickness corresponding to the amount of material removed during cutting. Accordingly, the grid pattern spacing a between the spherical depressions 2 is maintained during mounting. The separated or divided base plate sections are assembled by means of concave spherical surfaces 16 with fastening bores provided in the separation plane (end face) of the base plate portion. The securing screws 18 with intermediate pieces and nuts 19 provide a safe and precise connection. Thus, it is possible to produce base plates of most different shapes and sizes without disrupting the grid pattern or grid pattern spacing.

Figure 5:
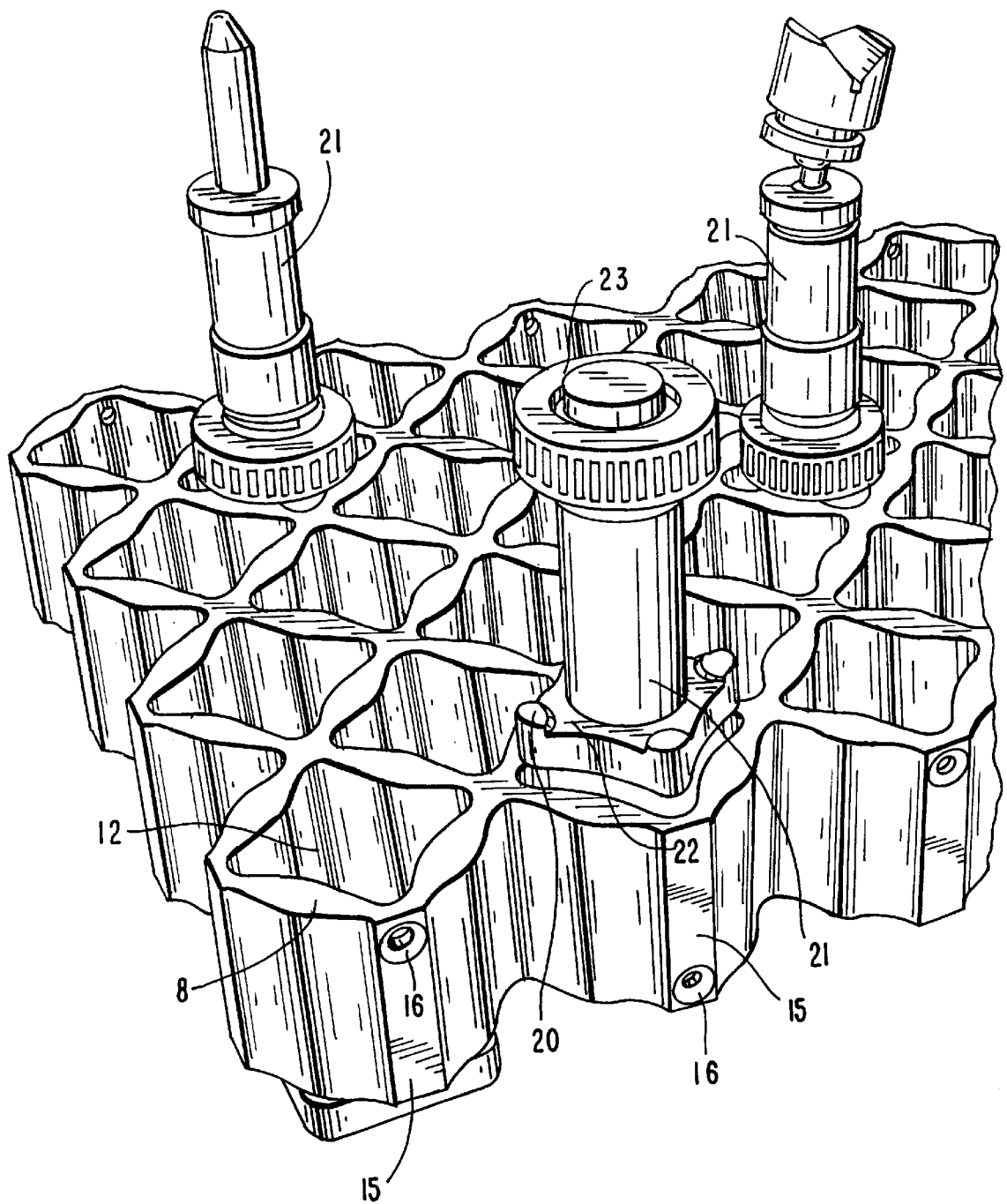
FIG. 5 is a view of the base plate according to the embodiment of FIG. 2, but upside down, so that the concave spherical depressions are positioned at the protected bottom side.
Figure 6:
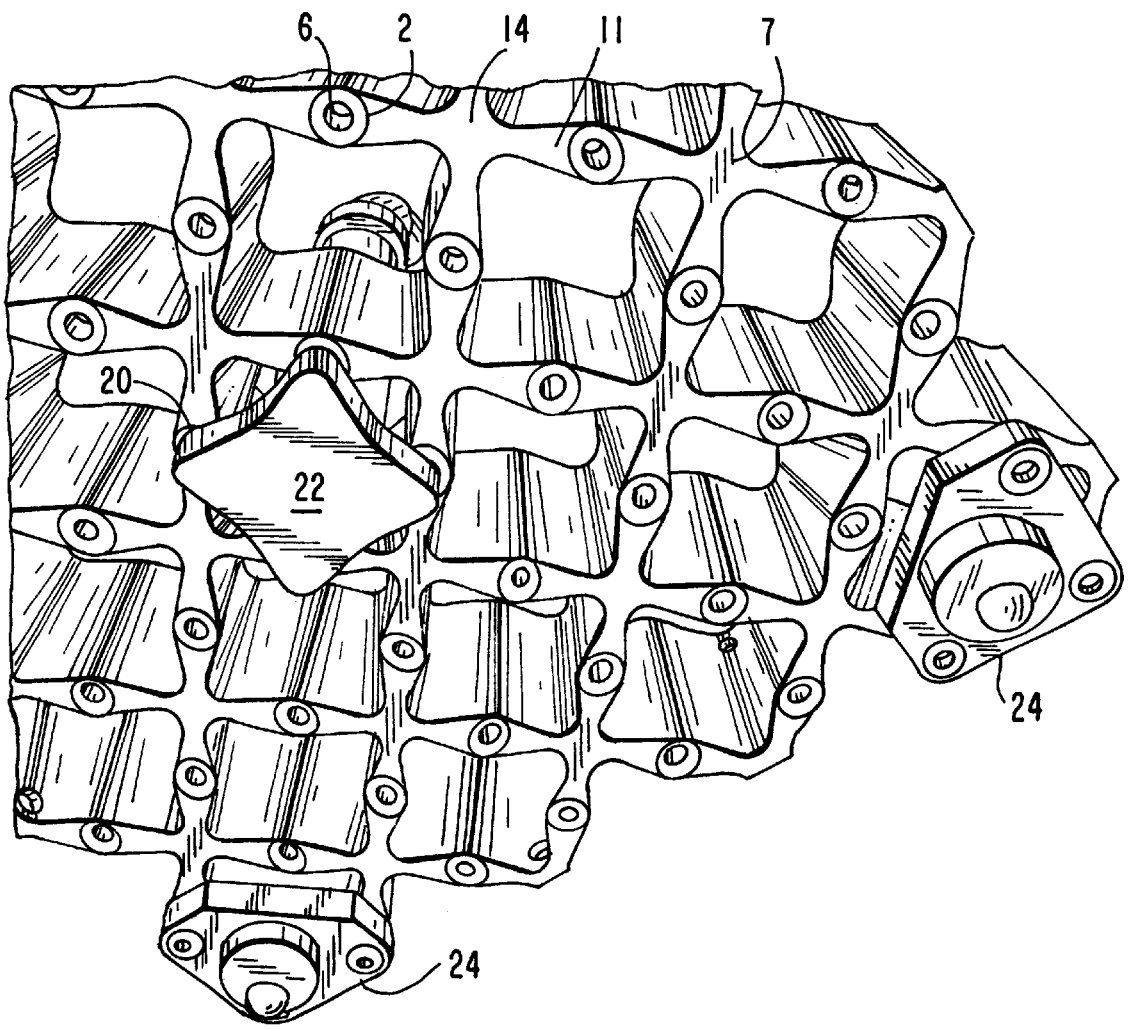
FIG. 6 is a view of the representation of FIG. 2, however, from below, for illustrating the fastening of foot and connecting elements.

FIGS. 5 and 6 show how the base plate according to the embodiment of FIGS. 2 through 4 can be used especially advantageously when a high loading or soiling risk is present for the surface which has the concave spherical depressions. This surface is positioned upside down so that the unmachined surface will be the top surface exposed to possible soiling or loading. Through the substantially square penetrations or voids 12 a mounting element (foot element or connecting element) is pushed and correctly positioned with the aid of spherical depressions 2 positioned at the bottom side of the base plate. For this purpose, the feet 22 of the foot or connecting elements 21 have a shape which corresponds to the cross-section of a void or penetration 12 but is matched such that it can be pushed through the penetration. After completion of insertion, the foot is rotated by 45° about its insertion axis so that convex spherical projections 20 at the upper side of the foot 22 facing the bottom side of the base plate can snap into position in the concave spherical depressions 2. The connecting element 21 can then be fastened with the aid of a fastening means 23 which in this case is a threaded ring. It is also possible to fasten a mounting element in the form of a foot element in this manner. However, it is also possible to fasten foot elements 24 in the manner already disclosed in connection with the foot elements 25 of FIG. 3.

The use of the base plate as shown in FIGS. 5 and 6 illustrates that the base plate in this manner can be used very universally for different applications. The concave spherical depressions, which are used for building devices and for attaching receiving parts and which define the grid points of the corresponding grid pattern, can be used very universally also for fastening other building component and device parts.

While specific embodiments of the invention have been shown and described in detail to illustrate the inventive principles, it will be understood that the invention may be embodied otherwise without departing from such principles.

What is claimed is:

1. A base plate for building devices for clamping workpieces in a defined and reproducible position, the base plate having a first surface with first concave spherical depressions, wherein each of the first concave spherical depressions has a center point located on or vertically above the first surface, wherein the center points form first grid points arranged in a uniform grid pattern of perpendicularly crossing center lines spaced from one another by a uniform grid pattern spacing, wherein each one of the center points is located on a point of interception of the perpendicularly crossing center lines and wherein the grid pattern defines an ideal surface of the base plate, wherein the ideal surface is a planar surface positioned vertically above the first surface.

2. The base plate according to claim 1, wherein the base plate has a grid structure having first grid rods and second grid rods intersecting the first grid rods at rod intersections, wherein the first and second grid rods extend diagonally at an angle of 45° to the perpendicularly crossing center lines and define substantially square voids between the first and second grid rods, wherein each one of the first and second grid rods is comprised of grid rod sections extending between two neighboring ones of the rod intersections, wherein each one of the grid rod sections has a center portion and wherein the center points of the first concave spherical depressions are located centrally on the center portions.

3. The base plate according to claim 2, wherein the rod intersections have second concave spherical depressions defining second grid points, wherein the second concave spherical depressions have center points located on points of interception of diagonal lines extending centrally along the first and second grid rods.

4. The base plate according to claim 3, wherein the first and second concave spherical depressions have fastening bores extending at a right angle to the perpendicularly crossing center lines.

5. The base plate according to claim 4, wherein the fastening bores are threaded.

6. The base plate according to claim 3, wherein the base plate is comprised of two or more base plate portions and wherein a separating line between the base plate portions extends through the center points of the second concave spherical depressions, wherein the base plate portions have end faces connected to one another and wherein the end faces have concave spherical fastening surfaces and fastening bores in the concave spherical fastening surfaces, the base plate having disc-shaped members with convex spherical sides matching the concave spherical fastening surfaces and postioned in the concave spherical fastening surfaces of two neighboring end faces, the base plate further having securing screws penetrating the fastening bores of the two neighboring end faces and the disc-shaped members positioned in the concave spherical fastening surfaces, wherein the disc-shaped members have an effective thickness between the end faces such that the uniform grid pattern spacing is maintained between the two base plate portions.

7. The base plate according to claim 2, comprising mounting elements configured to cooperate with the first concave spherical depressions and having fastening means for securing the connecting elements at the base plate, wherein the first concave spherical depressions are positioned at a bottom side of the base plate and wherein the mounting elements have a foot configured to match a cross-sectional shape of the voids so as to be pushable through one of the voids from a top side of the base plate and become positioned at the bottom side, wherein the foot has an upper side facing the bottom side of the base plate and wherein the upper side of the foot has convex spherical projections configured to match the shape and the grid pattern of the first concave spherical depressions at the bottom side of the base plate, wherein the convex spherical projections are configured to snap into the concave spherical depressions after pushing the foot through one of the voids and rotating the foot by 45°, the mounting element being secured by the fastening means when the convex spherical projections are snapped into the concave spherical depressions.

8. The base plate according to claim 7, wherein the convex spherical projections are positioned on ends of diagonal lines extending perpendicularly through the foot portion.

9. The base plate according to claim 1, comprised of a cast aluminum member.

* * * * *